United States Patent [19]
Shimizu et al.

[11] Patent Number: 5,681,463
[45] Date of Patent: Oct. 28, 1997

[54] PORTABLE LIQUID PURIFYING DEVICE HAVING ACTIVATED CARBON FILTER AND MICRO-POROUS MEMBRANE FILTER

[75] Inventors: Kazuo Shimizu; Satoru Matumoto, both of Nagoya; Makoto Nakagawa, Aichi-ken; Masashi Endo, Gifu-ken, all of Japan

[73] Assignee: Tomey Technology Corp., Japan

[21] Appl. No.: 608,215

[22] Filed: Feb. 28, 1996

Related U.S. Application Data

[63] Continuation of Ser. No. 218,937, Mar. 28, 1994, abandoned.

[30] Foreign Application Priority Data

| Mar. 31, 1993 | [JP] | Japan | 5-021611 U |
| Mar. 1, 1994 | [JP] | Japan | 6-031561 |

[51] Int. Cl.⁶ ............................................. C02F 9/00
[52] U.S. Cl. ..................... 210/266; 210/282; 222/189.08
[58] Field of Search ........................... 210/266, 282; 222/189.08

[56] References Cited

U.S. PATENT DOCUMENTS

| 2,761,833 | 9/1956 | Ward | 210/282 |
|---|---|---|---|
| 2,869,724 | 1/1959 | McDevitt | 210/282 |
| 3,038,610 | 6/1962 | Hetherington | 210/282 |
| 3,392,837 | 7/1968 | Sanzenbacher | 210/282 |
| 3,715,035 | 2/1973 | Teeple, Jr. et al. | 210/249 |
| 4,636,307 | 1/1987 | Inoue et al. | 210/266 |
| 4,769,143 | 9/1988 | Deutsch et al. | 210/266 |
| 4,911,840 | 3/1990 | Underwood | 210/266 |
| 4,913,808 | 4/1990 | Haque | 210/266 |
| 5,080,800 | 1/1992 | Heyl et al. | 210/681 |
| 5,122,272 | 6/1992 | Iana et al. | 210/473 |
| 5,160,038 | 11/1992 | Harada et al. | 210/266 |

FOREIGN PATENT DOCUMENTS

| 0138060 | 4/1985 | European Pat. Off. . |
| 0366534 | 5/1990 | European Pat. Off. . |
| 64-21794 | 2/1989 | Japan . |
| 1-124290 | 8/1989 | Japan . |

*Primary Examiner*—Ivars Cintins
*Attorney, Agent, or Firm*—Parkhurst, Wendel & Burr, L.L.P.

[57] ABSTRACT

A portable liquid purifying device for dispensing a liquid, which includes a squeezable bottle made of a soft material and containing a mass of the liquid, a filtering member removably engaging a bottleneck of the bottle, and a cover assembly for covering a spout formed through the filtering member so as to fluid-tightly close the spout. The filtering member has a first section which accommodates activated carbon, and a second section which accommodates a microporous membrane filter including hollow fibers, the first and second sections being disposed in series so that the liquid delivered out of the bottle passes through the first and second sections in this order. The filtering member is fluid-tightly and air-tightly attached to the bottleneck such that the filtering member does not protrude past the bottleneck. The cover assembly has a first position for fluid-tightly closing the spout, and a second position for opening the spout so as to permit the liquid to flow out of the device.

13 Claims, 7 Drawing Sheets

PORTABLE LIQUID PURIFYING DEVICE HAVING ACTIVATED CARBON FILTER AND MICRO-POROUS MEMBRANE FILTER

This is a Continuation of application Ser. No. 08/218,937 filed Mar. 28, 1994, now abandoned.

BACKGROUND OF THE INVENTION

1. Field of the Invention

The present invention relates generally to a portable liquid purifying device, and more particularly to the liquid purifying device which has a simple and compact structure, and which is suitable for emergency use and easy to carry around.

2. Discussion of the Related Art

Conventionally, various liquids used in the fields of medical treatment, health and hygienics, such as a soaking or cleaning solution for contact lenses, are stored or accommodated in suitable containers, and thus distributed to users. In many other cases, users purchase distilled water, and dissolve granular drugs or tablets in the distilled water, so as to prepare a desired solution for use as a pharmaceutical liquid.

In the former case, using a new sterile container does not cause any problem. When the container storing a large amount of solution is used in a non-fully-sealed state for a long period of time, however, microorganisms may enter through the bottleneck of the container, whereby the solution is likely to be contaminated by the microorganisms. In the latter case, the distilled water is not sterile, and therefore microorganisms may propagate or grow in the solution under storage, which may result in a hygienically dangerous situation.

In view of the above problems, there have been proposed various liquid purifying devices each having a micro-porous membrane in the form of a film or hollow fibers attached to a bottleneck of a bottle. Such a liquid purifying device is used for purifying a solution, distilled water or the like which has been contaminated, so as to obtain a sterile liquid. That is, the use of this kind of liquid purifying device makes it possible to easily obtain a sterile liquid, since the liquid passes through the micro-porous membrane when it flows out of the bottleneck of the bottle, so that microorganisms, contaminants and other foreign matters are removed from the liquid.

However, it is difficult and costly to manufacture the above-described known liquid purifying device since the device has a complicated structure and is relatively large-sized. Further, the known device is not easily carried around and is not suitably employed as a portable water purifier for use upon travelling or in a state of emergency. Thus, the known device finds considerably limited applications.

The known liquid purifying device has another problem, that is, smell may remain in the liquid even if it is free from microorganisms or contaminants or other foreign matters. Where the liquid has an offensive odor or smell, or where an irritating odor remains in the liquid due to its sterilization by hypochlorous acid, for example, it is undesirable or unfavorable to use the thus obtained sterile liquid owing to its smell.

If the known liquid purifying device employing a micro-porous membrane in the form of hollow fibers is once used, and then left unused for a long period of time, microorganisms may propagate on the surfaces of the hollow fibers provided in a filtering portion of the device, causing an offensive odor or smell which makes it very difficult to use the device in a field, such as a campsite. While the above-described known liquid purifying device is capable of purifying water, it is unable to remove ions from the water. When only a hard water, which is not suitable for drinking, is available during travelling, the known device is not able to change the hard water into a soft water which is suitable for drinking.

SUMMARY OF THE INVENTION

It is therefore an object of the present invention to provide a portable liquid purifying device which is easy to carry around, easy to handle, and is constructed as simply as possible with a considerably reduced number of components, and which is therefore easily manufactured at a reduced cost. It is another object of the present invention to eliminate smell of a sterile liquid which is obtained by the liquid purifying device. It is a further object to avoid an offensive odor or smell which is caused by propagation of microorganisms at a micro-porous membrane filter of the device, and to purify a hard water or change the same into a soft water.

The above object may be accomplished according to the principle of the present invention, which provides a portable liquid purifying device for dispensing a liquid, comprising: (a) a thin-walled squeezable bottle made of a soft material and having an interior space in which a mass of the liquid is stored, the bottle having a bottleneck through which the liquid is delivered out of the bottle; (b) a filtering member removably engaging the bottleneck of the bottle, the filtering member having a first section which accommodates activated carbon, and a second section which accommodates a micro-porous membrane filter comprising hollow fibers, the first and second sections being disposed in series so that the liquid delivered out of the bottle passes through the first and second sections in this order, the filtering member further having a spout formed adjacent to the second section, the filtering member being fluid-tightly and air-tightly attached to the bottleneck such that the first section is located closer to the bottleneck than the second section and such that the filtering member does not protrude into the interior space past the bottleneck; and (c) a cover assembly for covering the spout of the filtering member, the cover assembly having a first position for fluid-tightly closing the spout, and a second position for opening the spout so as to permit the liquid to flow out of the liquid purifying device.

The above-described portable liquid purifying device constructed according to the present invention has a considerably simple structure having the bottle, filtering member and cover assembly, and is made relatively light-weight and small-sized. Therefore, the present device can be easily manufactured at a significantly reduced cost. Further, the present liquid purifying device is easy to carry around, and finds a considerably wide range of applications. For example, the device may be used as a liquid or water purifier during travelling or in a state of emergency upon disaster. In addition, the thin-walled bottle made of a soft material can be advantageously folded or rolled up when it is not in use, and is thus made further small-sized or compact, making it easier to carry the device. The ease of use of the liquid purifying device is significantly increased or enhanced if the device with the folded bottle is carried around while it is contained in a bag or container.

In operation, the liquid can be easily delivered out of the liquid purifying device, by lightly gripping and squeezing the bottle by hand. Since the bottle is thin-walled and made of a soft material, the resiliency or repulsiveness of the bottle is low upon squeezing of the bottle. If the bottle was highly resilient or repulsive, the pressure within the bottle would be lowered when the squeezed bottle is restored to the original shape, with the liquid being filtered and delivered from the bottle. In such case, it would be difficult to squeeze the bottle to filter the liquid unless air flows into the bottle to raise the pressure in the bottle. However, since the bottle used according to the present invention is thin-walled and has a sufficiently low degree of resiliency, the purifying device does not suffer from such a drawback.

During the squeezing action, the liquid passes through the activated carbon and micro-porous membrane filter of the filtering member, and is effectively sterilized and purified, to thereby easily provide a sterile liquid. Even when the liquid has an offensive odor or smell or when the liquid has an irritating odor of a sterilizer, such as hypochlorous acid, such an offensive or irritating odor can be effectively removed from the liquid owing to the function of the activated carbon when the liquid passes through the activated carbon and micro-porous membrane filter. As a result, the obtained sterile liquid is free of smell and is favorably used as a drinking water or the like. In one preferred form of the present invention, the filtering member includes a cylindrical housing which is attached at one axial end thereof to the bottleneck of the bottle and has the spout formed at the other axial end, and a cylindrical member disposed within the cylindrical housing. The cylindrical member has a bottom at one axial end, and a cylindrical wall portion having numerous through-holes formed therethrough. The spout communicates with the inside of the cylindrical member which forms the second section, and the cylindrical member is surrounded by an activated carbon layer which constitutes the first section.

In another preferred form of the invention, the filtering member includes a cylindrical housing which is attached at one axial end thereof to the bottleneck of the bottle and has a spout formed at the other axial end. The filtering member further includes a fluid-permeable partition member disposed at an axially middle portion of the cylindrical housing to divide the inside of the housing into the first section on the side of the bottleneck, and the second section on the side of the spout.

In the above-described form of the invention, the cylindrical housing may include a large-diameter cylindrical portion which is formed integrally with an end portion of the cylindrical housing which defines the first section, such that the large-diameter cylindrical portion is spaced apart from an outer circumferential surface of the end portion of the cylindrical housing. The large-diameter cylindrical portion is attached to the bottleneck of the bottle such that at least a part of the first section is located within the bottleneck.

In a further preferred form of the invention, the filtering member includes a generally cylindrical member which has a small-diameter portion and a large-diameter portion, and has a spout formed through a bottom wall of the small-diameter portion. The large-diameter portion is attached to the bottleneck of the bottle. The second section extends from the small-diameter portion into the large-diameter portion, while the first section is formed around the second section. At least a part of the first and second portions is located within the bottleneck when the cylindrical member is attached to the bottleneck. In a still further preferred form of the invention, the filtering member further includes an ion exchange resin which is disposed upstream of the micro-porous membrane filter in the second section, as viewed in a direction of flow of the liquid, such that the liquid to be delivered out of the spout through the filtering member contacts the ion exchange resin before contacting the micro-porous membrane filter. In this case, the ion exchange resin may be accommodated in the bottle, such that the liquid in the bottle contacts the ion exchange resin. Otherwise, the ion exchange resin may be accommodated in a fluid-permeable container, which is disposed upstream of the first section of the filtering member, as viewed in the direction of flow of the liquid.

With a suitable ion exchange resin disposed upstream of the micro-porous membrane filter in the second section of the filtering member as described above, the liquid to be delivered outside is brought into contact with the ion exchange resin, whereby ions are effectively removed from the liquid, particularly for changing a hard water into a soft water.

In another preferred form of the present invention, the filtering member further includes a powder or granular antibacterial material, which is disposed upstream of the micro-porous membrane filter in the second section, as viewed in a direction of flow of the liquid, such that the liquid that exists in the filtering member contacts the antibacterial material. In this case, the antibacterial material may advantageously be disposed in at least one of the first and second sections of the filtering member. The use of the antibacterial material makes it possible to prevent propagation of microorganisms in the filtering member, in particular on the outer surfaces of the micro-porous membrane filter, so as to effectively avoid occurrence of an offensive odor or smell, even when the device is left unused for a long period of time.

In a further preferred form of the invention, the activated carbon is covered with a non-woven fabric and disposed within the first section. The use of the non-woven fabric makes it easier to maintain the shape of the activated carbon, thereby making it easy to manufacture a desired liquid purifying device. The non-woven fabric also advantageously prevents activated carbon particles from flowing out and adhering to the micro-porous membrane filter, and thus solves the problems of darkened and deteriorated appearance of the filter.

In a still further preferred form of the invention, the liquid purifying device further includes a cup-shaped cover having an open end portion which is snugly placed on a stepped portion of the bottle formed adjacent to the bottleneck, so as to cover a whole assembly of the filtering member and the cover assembly. In this case, the cup-shaped cover can be used as a cup for receiving a purified liquid delivered out of the purifying device. At the same time, the cup-shaped cover, which covers the whole assembly of the filtering member and cover assembly, can effectively serve as a protecting cover for protecting both the filtering member and the cover assembly.

BRIEF DESCRIPTION OF THE DRAWINGS

The foregoing and optional objects, features and advantages of the present invention will be better understood by reading the following detailed description of presently preferred embodiments of the invention, when considered in connection with the accompanying drawings, in which.

DETAILED DESCRIPTION OF THE PREFERRED EMBODIMENTS

Figure 1:
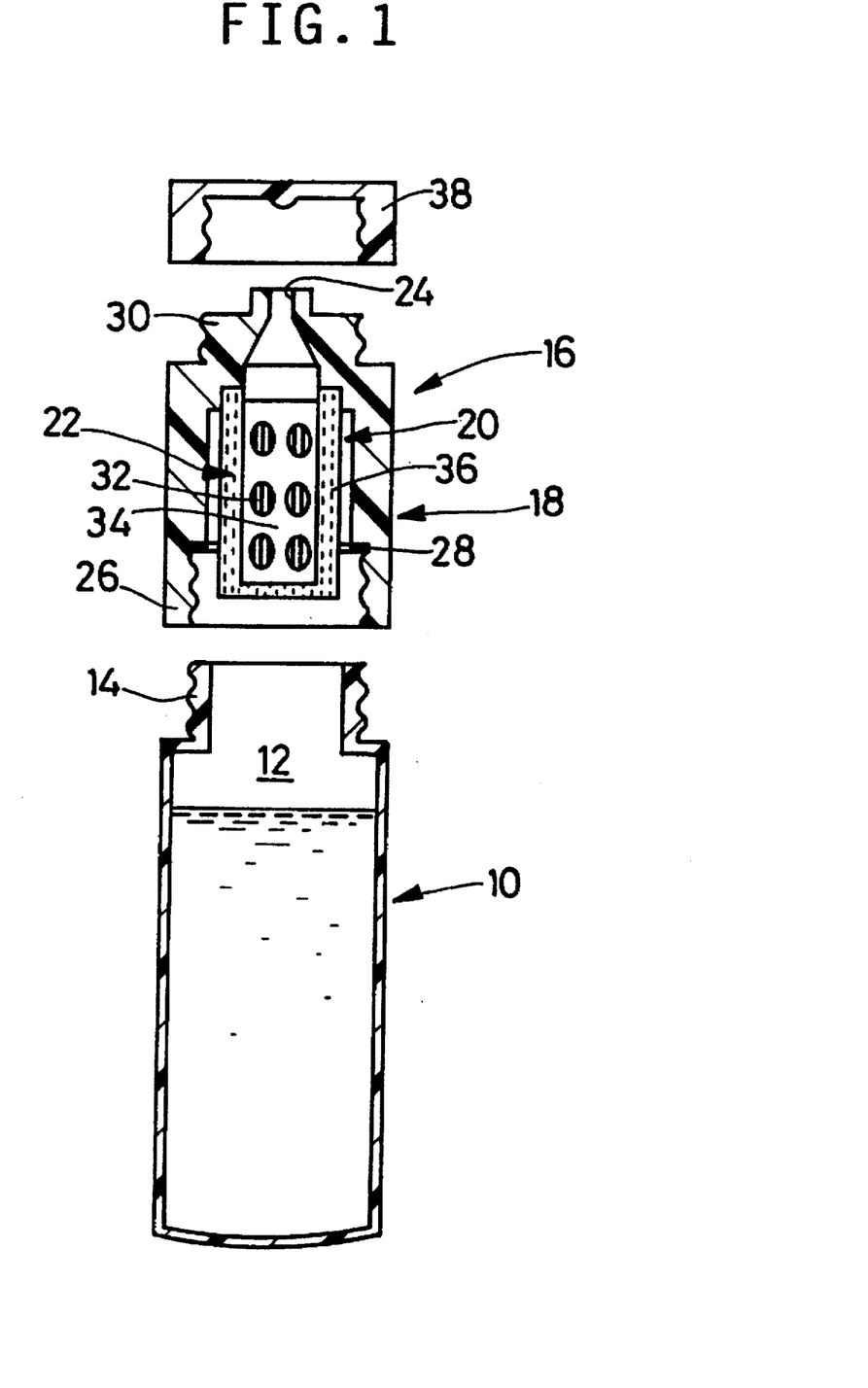
FIG. 1 is a cross sectional view showing one preferred embodiment of a portable liquid purifying device of the present invention.

Referring first to FIG. 1 showing one preferred embodiment of a portable liquid purifying device of the present invention, reference numeral 10 denotes a generally cylindrical bottle which is closed at one axial end, and which has an interior space 12 for storing a liquid, such as tap water, river water, pond water or other solutions. The bottle 10 has a cylindrical bottleneck 14 whose outer circumferential surface is threaded, for attachment or engagement with a filtering member 16 which will be described. The bottleneck 14 has an opening through which the liquid is delivered out of the interior space 12.

The bottle 10 is formed of a soft material with a relatively small wall thickness, and has dimensions which allow the body 10 to be easily squeezed by a hand. It is particularly desirable that the shape and size of the bottle 10 be determined so that the body 10 can be easily gripped by a palm. That is, the bottle 10 is preferably gripped and squeezed by a palm rather than by fingers, with an increased gripping or squeezing force, so as to achieve a larger amount of flow of the liquid to be filtered and then delivered from the filtering member 16. In this particular embodiment, the lower portion of the bottle 10 that excludes the bottleneck 14 has a diameter of 45 mm and a height of 100 mm.

The soft material of which the bottle 10 is formed is not limited to any specific material, but may be selected from various high polymeric materials or polymers, such as polyurethane, polypropylene, polyethylene, polycarbonate, and polyvinyl chloride, and a material in which aluminum is vapor-deposited on polyethylene, for example. Although the wall thickness of the bottle 10 is considered sufficiently small if the body 10 can be easily squeezed by a hand, it is more preferable that the bottle 10 has a wall thickness small enough to allow the body 10 to be folded or rolled up when it is not in use, so as to make the body 10 further small-sized or compact.

In FIG. 1, reference numeral 16 denotes a filtering member having a housing 18 which has a first section 20 that contains activated carbon, and a second section 22 that accommodates a micro-porous membrane filter in the form of a hollow fiber module 32 which will be described in detail. The housing 18 further has a spout 24 formed adjacent to the second section 22. The first and second sections 20, 22 are provided in the housing 18 such that the liquid flows from the interior space 12 to the spout 24, passing through the first section 20 and the second section 22 in this order.

More specifically, the housing 18 is a generally cylindrical member closed at its upper end and having an internally threaded lower open end portion 26. The housing 18 is fluid-tightly and air-tightly attached to the bottle 10 with the lower opening end portion 26 engaging the externally threaded bottleneck 14 of the bottle 10 through a packing 28. The spout 24 of the housing 18 is in the form of a through-hole formed through the center of the upper end wall of the housing 18. The housing 18 further includes an engaging portion 30 formed on the outer surface of the upper end portion of the housing 18 so as to partially surround the spout 24. With an internally threaded lid 38 screwed on the engaging portion 30 of the housing 18, the spout 24 is protected against microorganisms and other contaminants so as not to be contaminated. The spout 24 is placed in its closed position when the lid 38 is placed on the housing 18, and in its open position when the lid 38 is removed from the housing 18. The housing 18 of the filtering member 16 may include a transparent portion which corresponds to the whole or a part of the second section 22 accommodating the hollow fiber module 32. In this case, one can find contamination of the hollow fiber module 32 through the transparent portion of the housing 18, and make a judgement whether the fiber module 32 should be replaced by a new one.

The lid 38 and a part of the housing 18 in the vicinity of the spout 24 may be made of an antibacterial material since these portions are likely to be contaminated by microorganisms and other contaminants. In this case, the antibacterial material may be composite materials comprising plastics and known antibacterial materials, such as antibacterial fibers, ceramic or glass.

A cylindrical member 34 for accommodating the hollow fiber module 32 as the micro-porous membrane filter is attached to the housing 18 such that the cylindrical member 34 that is closed at one axial end is fitted at the other end in the inner wall of the housing 18 adjacent to the spout 24. Thus, the second section 22 is formed or defined by the cylindrical member 34. The cylindrical member 34 has numerous holes formed through the wall thickness thereof, for permitting fluid communication between the inside and outside of the cylindrical member 34.

The hollow fiber module 32 generally includes a loop or U-shaped array of a plurality of hollow fibers each having a micro-porous wall structure, and a header to which the end portions of the U-shaped array consisting of the opposite open ends of the fibers are bonded with a suitable adhesive such as polyurethane. The header of the fiber module 32 is fitted in the opening of the cylindrical member 34. The micro-porous hollow fibers have pores whose diameter is large enough to permit the liquid stored in the bottle 10 to pass therethrough, but is small enough to inhibit the passage of microorganisms and other contaminants or foreign matters. More specifically, in order to remove the microorganisms and foreign matters, the micro-porous structure of the hollow fibers is generally required to prevent the passage of particles having a diameter of 0.2–0.3 μm or larger. When it is desired to filter virus as well as microorganisms, the micro-porous structure of the hollow fibers should have smaller diameters.

The micro-porous hollow fibers may be made of high polymers, such as polyolefin, polyvinyl alcohol, polysulfone, polyacrylonitrile, cellulose acetate, polymethyl methacrylate and polyamide, by a suitable known method. While the micro-porous hollow fibers are generally made of a material having hydrophilic property, the fibers may be made of a material having hydrophobic property, and then processed to give the fibers the hydrophilic property. It is also possible to use a mixture of hydrophilic micro-porous hollow fibers and hydrophobic fibers, or to use micro-porous hollow fibers each having a hydrophilic portion and a hydrophobic portion. In such cases, the hollow fiber module 32 functions to exhale or remove air from the interior of the bottle 10.

A cylindrical carbon body 36 having a bottom wall is provided so as to cover the outer circumferential and bottom surfaces of the cylindrical member 34 and thus define the first section 20. This carbon body 36 is formed by pressing fiber-like activated carbon in a mold. The use of expensive fibrous activated carbon is still advantageous because of its handling ease and a favorably simplified construction of the first section 20, which eventually reduces the number of components required to form the filtering member 16.

In the thus constructed filtering member 16, the first and second sections 20, 22 are disposed in series so that the liquid can pass through the first and second sections 20, 22 in this order, and flow toward the spout 24 formed adjacent to the second section 22. Since the first and second sections 20, 22 are formed within the housing 18, the filtering member 16 can be attached to the bottleneck 14 of the bottle 10 such that the member 16 does not protrude into or enter the interior space of the bottle 10 past the bottleneck 14.

In operation of the thus constructed liquid purifying device, the lid 38 is removed to open the spout 24, and the bottle 10 is squeezed by a hand, so that the liquid stored in the bottle 10 can be quite easily delivered to the outside of the device. Since the activated carbon body 36 and hollow fiber module 32 of the filtering member 16 do not prevent or interfere with the squeezing action as described above, the bottle 10 and filtering member 16 are favorably free from otherwise possible damages upon squeezing of the bottle 10. When the liquid to be delivered passes successively through the first and second sections 20, 22 of the filtering member 16, an offensive odor or smell, an irritating odor or smell and the like can be removed from the liquid by the activated carbon body 36 in the first section 20, and the microorganisms and foreign matters can be removed by the micro-porous fiber module 32 in the second section 22. As a result of the effective cleaning and removal of microorganisms, the instant liquid purifying device can easily provide a purified liquid which is free of smell.

The portable liquid purifying device as described above has a considerably simple and compact structure having the bottle 10, filtering member 16 and lid 38, and can therefore be easily manufactured at a significantly reduced cost. Further, the instant liquid purifying device is handy and easy to carry, and therefore finds a considerably wide variety of applications. For example, the present device may be favorably used to prepare contact lens solutions from tap water, during travelling, or may be used as an emergency water purifier if carried upon disaster. Moreover, the bottle 10 formed of a soft material with a small wall thickness can be folded or rolled up when it is not in use, which further reduces the size of the instant device and makes is easier to carry.

As described above, the filtering member 16 is attached to the bottle 10 such that the activated carbon body 36 and hollow fiber module 32 do not protrude beyond the bottleneck 14 of the bottle 10. Therefore, the bottle 10 which does not contain a liquid can be folded as desired without causing any problems. The liquid purifying device consisting of the folded bottle 10, filtering member 16 and lid 38 may be accommodated in a suitable bag or container made of a plastic material, for example, and thus considerably easily carried around.

Figure 2:
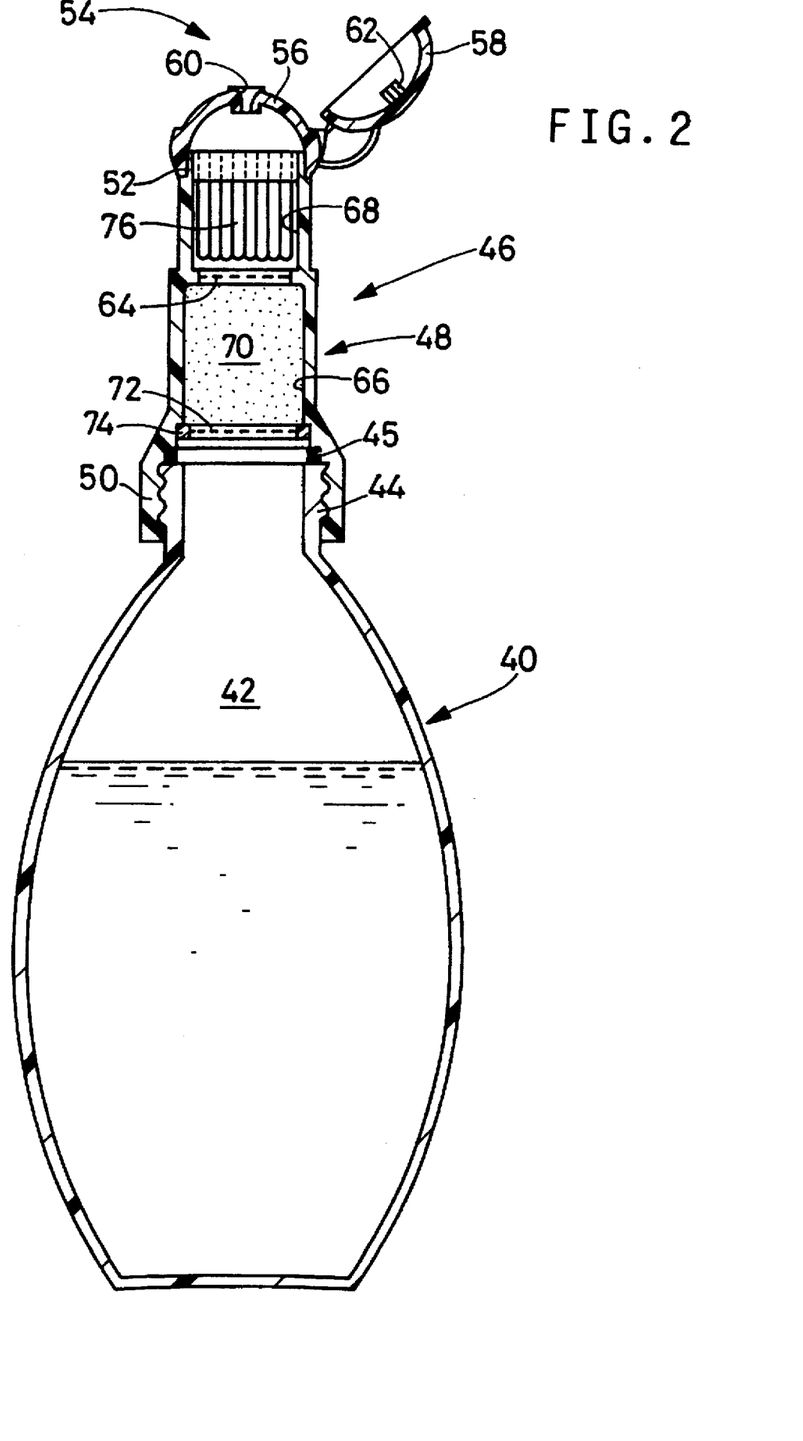
FIG. 2 is a cross sectional view showing another embodiment of a portable liquid purifying device of the present invention.

Referring next to FIG. 2 showing another embodiment of a portable liquid purifying device of the present invention, reference numeral 40 denotes a bottle which is formed of a soft material with a relatively small wall thickness, and which assumes a generally cylindrical shape with its diameter gradually increasing toward the axially middle portion of the bottle 40. The liquid stored in an interior space 42 of the bottle 40 is delivered out through an externally threaded bottleneck 44 formed at the upper end of the bottle 40.

A filtering member 46 has a generally cylindrical housing 48 which includes an internally threaded, first open end portion 50 formed at one axial end (the lower end in FIG. 2) thereof. The filtering member 46 is fluid-tightly and airtightly attached to the bottle 40 with the open end portion 50 of the housing 48 screwed upon the bottleneck 44 of the bottle 40 through a packing 45. The housing 48 has a second open end portion 52 formed at the other axial end (the upper end in FIG. 2) thereof. A flip-type cover assembly 54 consisting of a base portion 56 and a cap 58 is integrally fixed to the housing 48, with the second open end portion 52 press-fitted in or bonded to the base portion 56. The base portion 56 is formed with a spout 60 which can be closed by a protrusion 62 formed on the cap 58.

A water-permeable mesh sheet 64 which does not permit the passage of activated carbon is provided to extend to cover the entire cross sectional area of an axially middle portion of the housing 48, so as to axially divide the interior of the housing 48 into two sections, that is, a first section 66 formed on the side of the bottle 40, and a second section 68 formed on the side of the cover assembly 54. Further, a partition member 74 having a water-permeable mesh sheet 72 extending over the entire cross sectional area thereof is provided between the first section 66 and the bottle 40. This mesh sheet 72 does not permit the passage of activated carbon. A mass of granular activated carbon 70 is accommodated in a space between the two mesh sheets 64, 72. In the second section 68 of the housing 48, there is accommodated a hollow fiber module 76 serving as a micro-porous membrane filter, which is bonded and fixed to the second open end portion 52 of the housing 48.

In the thus constructed filtering member 46 in which the first and second sections 66, 68 are disposed in series within the housing 48, the liquid is delivered from the spout 60 of the cover assembly 54 after passing through the first and second sections 66, 68 in this order. Since the first and second sections 66, 68 are formed within the housing 48, the filtering member 46 is attached to the bottleneck 44 of the bottle 40 such that the member 46 does not protrude into the interior of the bottle 40 past the bottleneck 48.

In operation of the thus constructed liquid purifying device, the cap 58 of the cover assembly 54 is flipped open to place the spout 60 in its open position, and the bottle 40 is squeezed by a hand, so that the liquid stored in the bottle 10 can be quite easily delivered out of the device. Since the activated carbon 70 and hollow fiber module 76 of the filtering member 46 do not prevent or interfere with the squeezing action, the bottle 40 and filtering member 46 are favorably free from otherwise possible damages upon squeezing of the bottle 40. The liquid, which has passed successively through the first and second sections 66, 68 of the filtering member 46, is free of smell and is also purified owing to the functions of the activated carbon 70 and the hollow fiber module 76.

The portable liquid purifying device as described above has a considerably simple and compact structure having the bottle 40, filtering member 46 and cover assembly 54, and can therefore be easily manufactured at a significantly reduced cost. Further, the instant liquid purifying device is handy and easy to carry, and therefore finds a considerably wide variety of applications. For example, the liquid purifying device may be carried around during travelling or upon disaster. Further, the bottle 40 may be folded or rolled up when it is not in use, which further reduces the size of the instant device and makes it easier to carry.

Figure 3:
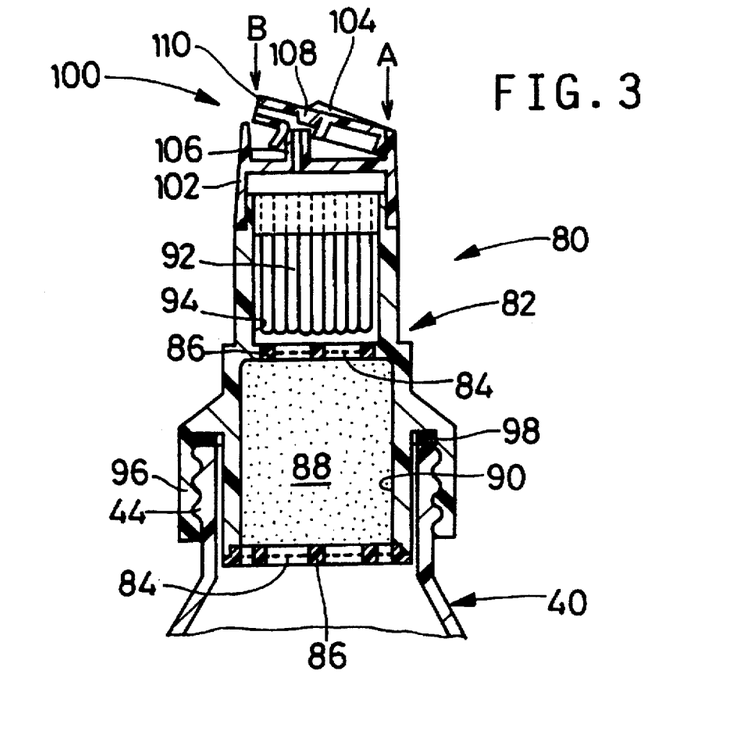
FIG. 3 is a cross sectional view showing another example of a filtering member and a cover assembly attached to a bottle of the liquid purifying device of FIG. 2.
Figure 4:
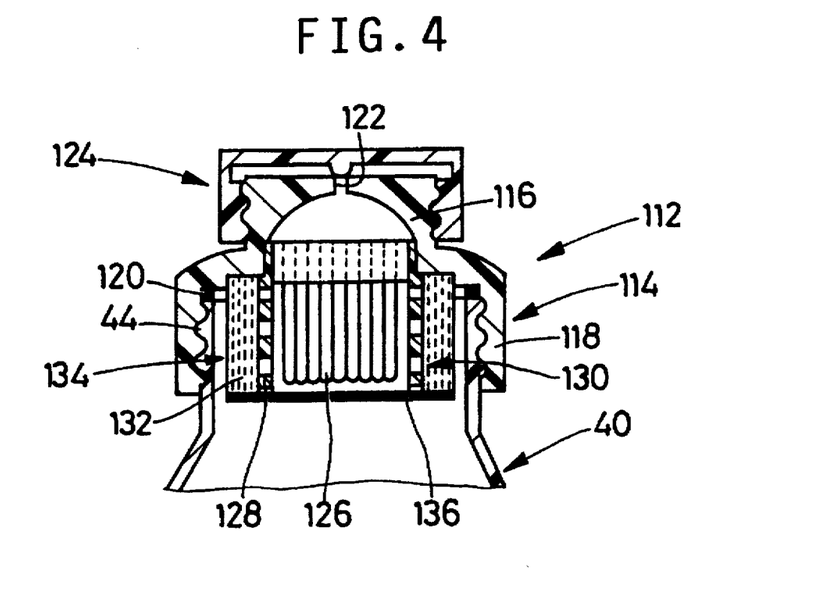
FIG. 4 is a cross sectional view showing a further example of a filtering member and a lid attached to the bottle as shown in FIG. 2.

Referring next to FIGS. 3 and 4, there are shown two specific examples of filtering member 80, 112 and cover assembly or lid 100, 124, each of which may be assembled with the bottle 40 shown in FIG. 2, to constitute the portable liquid purifying device according to the present invention.

In the filtering member 80 shown in FIG. 3, a generally cylindrical housing 82 has a middle and a lower partition member 86, 86 which are fixed to the axially middle part and lower end of the housing 82, respectively. Each partition member 86 has a water-permeable mesh sheet 84 which inhibits the passage of activated carbon. In this arrangement, a first section 90 for accommodating granular activated carbon 88 is formed below the middle partition member 86, and a second section 94 for accommodating the hollow fiber module 92 is formed above the middle partition member 86.

The housing 82 includes as an integral part thereof a large-diameter cylindrical portion 96 formed around the first section 90. With this cylindrical portion 96 screwed on the bottleneck 44 of the bottle 40 through a packing 98, the filtering member 80 is fluid-tightly and air-tightly attached to the bottle 40. Thus, the filtering member 80, which is smaller or more compact than that of FIG. 2, is attached to the bottle 40 without protruding into the interior of the bottle 40, namely, without protruding past the bottleneck 44 of the bottle 40.

A flip-type cover assembly 100 consisting of a base portion 102 and a cap 104 is fixed to the upper end portion of the housing 82 by bonding or press-fitting. A spout 106 formed through the base portion 102 is opened when the cap 104 is pressed down at point "A" as indicated in FIG. 3, and is closed by a protrusion 108 formed on the cap 104 when the cap 104 is pressed down at point "B". When the spout 106 is in its open position, the liquid delivered from the spout 106 of the base portion 102 is fed through a passage 110 formed in the cap 104, and is thus delivered out of the device.

The thus constructed portable liquid purifying device as described above has a simple structure having a comparatively small size, and can therefore provide the same effects as offered by the liquid purifying devices of the previous embodiments.

The filtering member 112 of FIG. 4 has a stepped, generally cylindrical housing 112 with a bottom at its upper end. The housing 112 includes an externally threaded small-diameter portion 116 on the side of the bottom, and an internally threaded large-diameter portion 118 on the side of its lower open end. A cylindrical container 128 which accommodates a hollow fiber module 126 is fitted at its one axial end in the small-diameter portion 116 of the housing 114 so as to extend through the large-diameter portion 118 and thus define a second section 130 of the housing 114. On the outer circumferential surface of the container 128, there is provided a cylindrical activated carbon body 132 formed by using activated fibrous carbon, which carbon body 132 itself forms a first section 134 of the housing 114.

The first and second sections 134, 130 of the housing 114 are held in fluid communication with each other, through numerous through-holes formed through the cylindrical wall of the container 128. A suitable clearance is formed between the outer circumferential surface of the activated carbon body 132 and the inner circumferential surface of the bottleneck 44 of the bottle 40. The lower ends (facing the bottom of the bottle 40) of the container 128 and activated carbon body 132 are covered with a seal packing 136, whereby the liquid flowing out of the container 40 passes through the first section 134 and the second section 130 in this order, in the radial direction of the housing 114.

With the large-diameter portion 118 of the housing 114 screwed on the bottleneck 44 of the housing 40 through a packing 120, the filtering member 112 is fluid-tightly and air-tightly attached to the bottle 40. The housing 114 has a spout 122 formed through the central part of the bottle wall thereof. This spout 122 is closed when the lid 124 is screwed on the small-diameter portion 116 of the housing 114, and is opened when the lid 124 is removed from the housing 114. The thus constructed filtering member 112 is made smaller-sized or more compact than those of FIGS. 2 and 3, and can be attached to the bottle 40 without protruding into the interior of the bottle 40.

The thus constructed portable liquid purifying device as described above has a simple structure having a comparatively small size, and can therefore provide the same effects as offered by the liquid purifying devices of the previous embodiments.

Figure 5:
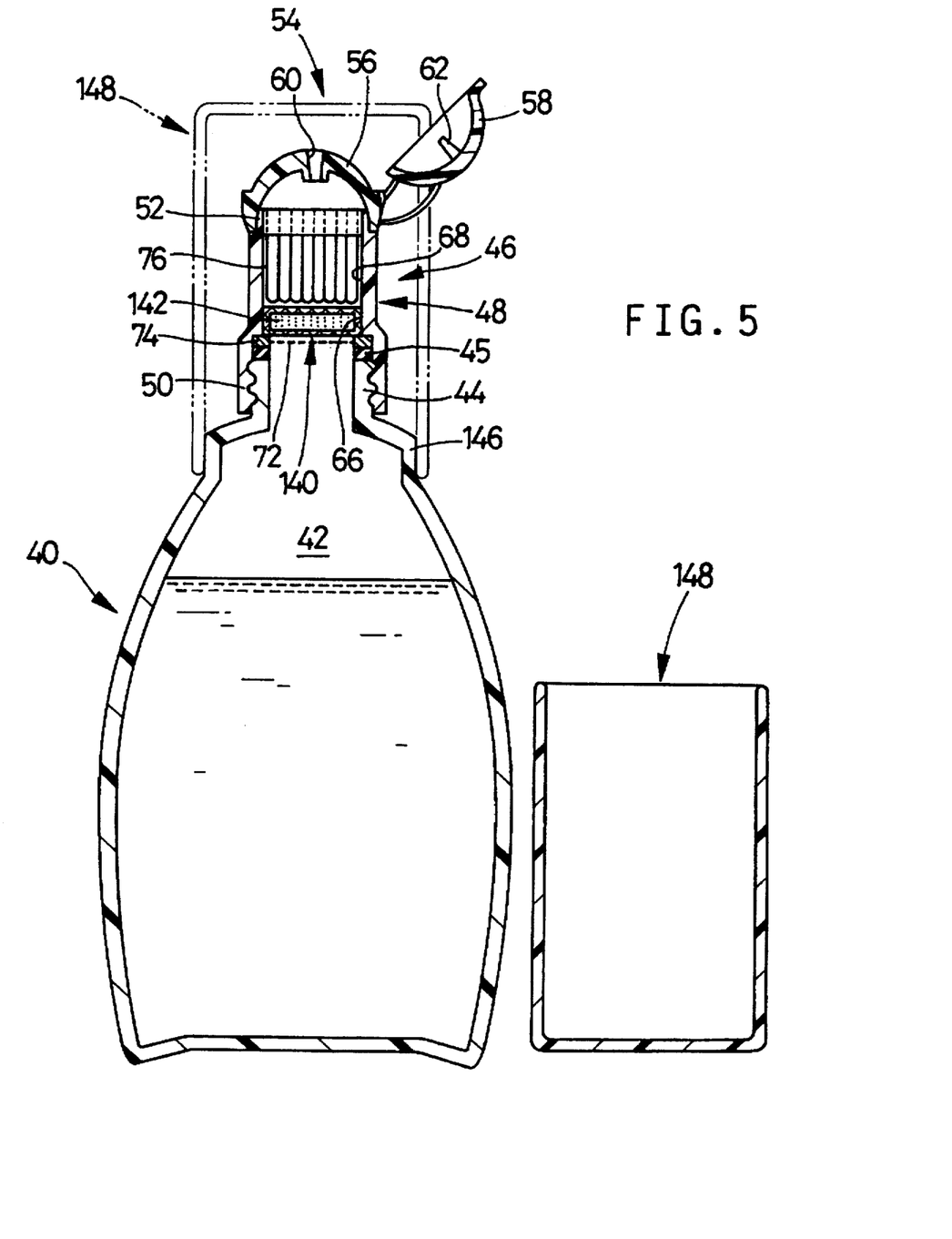
FIG. 5 is a cross sectional view showing a further embodiment of a portable liquid purifying device of the present invention.
Figure 6:
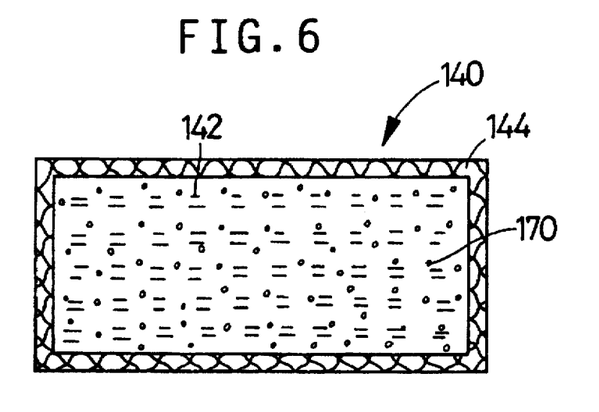
FIG. 6 is an enlarged cross sectional view of an activated carbon package used in the embodiment of FIG. 5.

Referring next to FIG. 5, there is illustrated another embodiment of the liquid purifying device of the present invention, which is different from the device as shown in FIG. 2 in that the first section 66 formed in the housing 48 of the filtering member 46 contains an activated-carbon package 140 as shown in FIG. 6, in place of the granular activated carbon 70. In FIG. 5, the same reference numerals as used in the embodiment of FIG. 2 are used to identify the structurally and/or functionally corresponding elements, of which no redundant description will be provided.

The activated-carbon package 140 used in the liquid purifying device includes a mass of activated fibrous carbon 142, which is wrapped in a water-permeable layer 144 consisting of a non-woven fabric, so as to prevent fragments or chips, dust and others of the activated carbon 142 from coming out of the package 140 and scattering or flying off. With the activated carbon 142 covered with the water-permeable layer 144 in the form of the non-woven fabric, the shape of the activated carbon can be easily and favorably maintained, thus making it easier to manufacture the liquid purifying device. It is to be understood that the activated fibrous carbon 142 of the activated-carbon package 140 may be replaced by an ordinary powdered or granular activated carbon, and that the water-permeable layer 144 may be made of a known water-permeable material such as mesh woven fabric, though the non-woven fabric is preferably used for the layer 144.

By squeezing the bottle 40 of the thus constructed liquid purifying device, the liquid contained in the bottle 40 is delivered out of the device, passing successively through the first and second sections 66, 68 of the filtering member 46, in the same manner as in the embodiment of FIG. 2. Consequently, the liquid, which passes through the activated-carbon package 140 disposed in the first section 66, is purified by means of the activated fibrous carbon 142 accommodated in the package 140. Having passed through the activated-carbon package 140, the liquid is further purified by the hollow fiber module 76 disposed in the second section 68, in the same manner as in the previous embodiments.

Since the present liquid purifying device employs the activated-carbon package 140 in which the activated fibrous carbon 142 is covered with the water-permeable layer 144 formed from the non-woven fabric, the particles of the activated carbon are advantageously kept from flowing out of the first section 66 and adhering to the surface of the hollow fiber module 76, which may cause some problems, such as deterioration of the appearance of the fiber module 76. In the liquid purifying device of the instant embodiment, the bottle 40 has a stepped portion 146 which consists of a shoulder portion adjacent to the bottleneck 44, and an annular protrusion which extends downwards from the shoulder portion over a suitable axial length. The liquid purifying device further includes a cup-shaped cover 148 whose open end portion is snugly placed on the annular protrusion of the stepped portion 146 of the bottle 140, so as to cover the whole assembly of the filtering member 46 and cover assembly 54. Thus, the cup-shaped cover 148 serves as a safety cover for the device.

When the portable liquid purifying device constructed as described above is used as a water purifier during travelling especially in a foreign country, hard water available from this device is often unsuitable for drinking due to high hardness of the water, even if the water has passed through the activated carbon and the micro-porous membrane filter. To overcome this problem, a suitable ion exchange resin, such as cation exchange resin used for softening the hard water, is disposed upstream of the hollow fiber module in the second section of the filtering member, as viewed in the direction of flow of the liquid through the device. In this arrangement, the liquid is first brought into contact with the ion exchange resin and then with the hollow fiber module, and is thereafter delivered outside through the spout of the filtering member. One embodiment of the invention which includes this arrangement is illustrated in FIG. 7.

Figure 7:
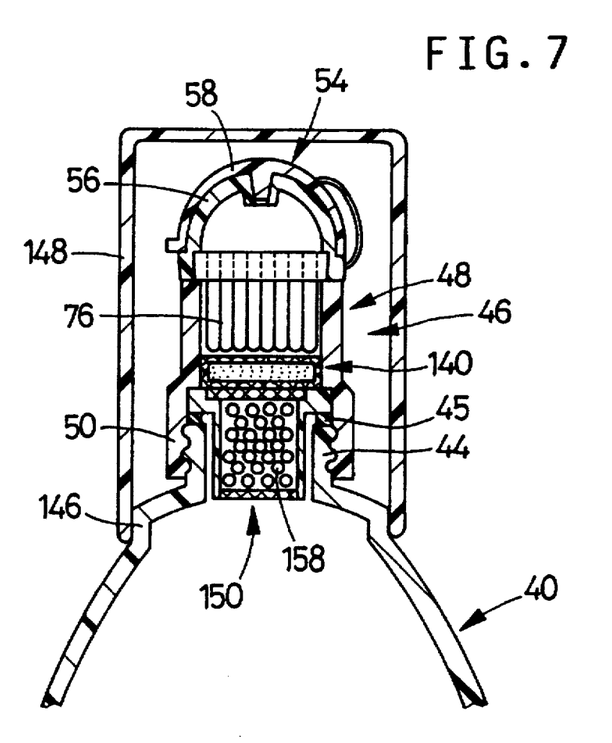
FIG. 7 is an elevational view partly in cross section, showing one example in which an ion exchange resin column is disposed in the structure as shown in FIG. 5.
Figure 8:
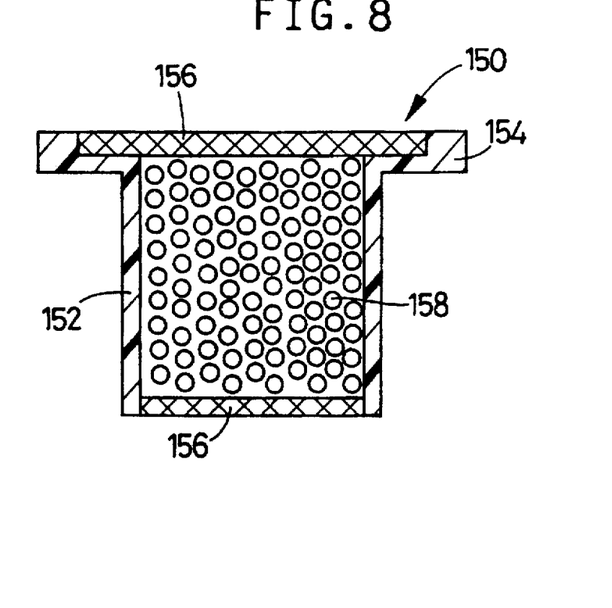
FIG. 8 is an enlarged cross sectional view of the ion exchange resin column used in the example of FIG. 7.

In the embodiment of FIG. 7 which is similar to that of FIG. 5, an ion exchange resin column 150 as shown in enlargement in FIG. 8 is positioned upstream of the activated carbon package 140 disposed in the housing 48 of the filtering member 46, as viewed in the direction of flow of the liquid. In operation, the liquid stored in the bottle 40 is caused to flow through the activated carbon package 140 after passing through the ion exchange resin column 150.

As is apparent from FIG. 8, the ion exchange resin column 150, which as a whole assumes a hat-like shape, has a cylindrical member 152 which has a flange 154 at its one axial end, and is closed at its opposite axial ends by respective water-permeable mesh sheets 156, 156. In the thus closed cylindrical member 152, there is accommodated ion exchange resin 158 in the form of granules, beads or balls, for example. The ion exchange resin column 150 is placed in position such that the flange 154 of the column 150 is gripped or sandwiched through a packing 45 by and between the bottleneck 44 of the bottle 40 and a stepped portion formed in the inner surface of the housing 48 of the filtering member 46. The thus positioned ion exchange resin column 150 does not protrude into the interior of the bottle 40 past the bottleneck 44.

With the ion exchange resin column 150 thus positioned, the liquid stored in the bottle 40 is brought into contact with the ion exchange resin 158 before being purified. Accordingly, ions are effectively removed from the liquid in the bottle 40, and the present liquid purifying device can thus be used as a portable water purifier for changing hard water into soft water suitable for drinking.

Figure 9:
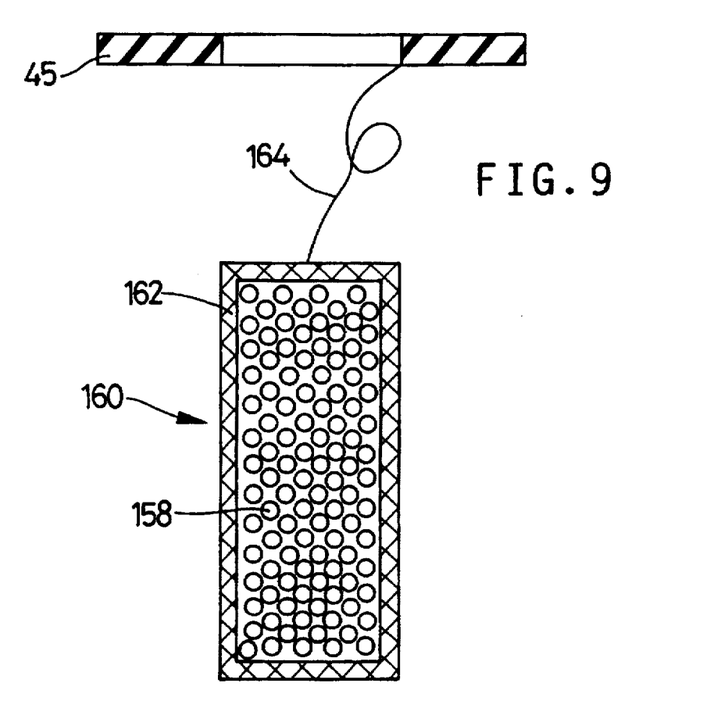
FIG. 9 is an enlarged cross sectional view showing an example of an ion exchange resin package which may be used in the example of FIG. 7, in place of the ion exchange resin column of FIG. 8.

While the illustrated embodiment employs the ion exchange resin column 150 having the ion exchange resin 158 accommodated in the cylindrical member 152, the ion exchange resin 158 in the form of granules or the like may be added to and dispersed in a liquid in the bottle 40, without causing any problem. FIG. 9 shows another embodiment which employs an ion exchange resin package 160 having granular ion exchange resin 158 surrounded by a water-permeable layer 162 consisting of non-woven fabric or mesh cloth or the like. This ion exchange resin package 160 may be connected to the packing 45 by a thread 164 having a suitable length, and inserted into the bottle 40 such that the package 160 is immersed in the liquid in the bottle 40 when the filtering member 46 is screwed on the bottleneck 44 of the bottle 40.

While the present invention has been described in detail in its presently preferred embodiments, for illustrative purpose only, it is to be understood that the invention is not limited to the details of the illustrated embodiments, but may be otherwise embodied.

Figure 10:
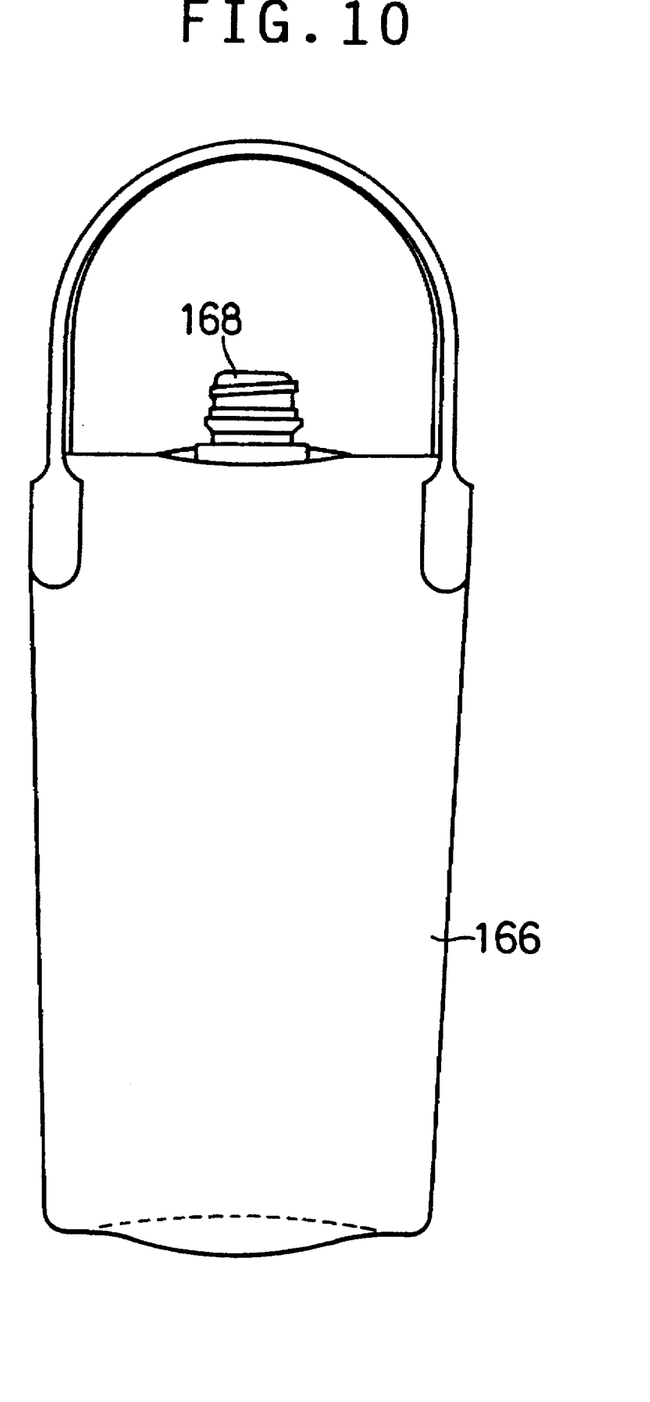
FIG. 10 is a front view showing an example of a drink pouch which may be used as a bottle of the portable liquid purifying device of the invention.

The shape and other features of the bottle are not limited to those of the illustrated embodiments, but may be changed as desired. For example, the bottle may take the form of a drink pouch 166 as shown in FIG. 10, which is conventionally used for containing soft drink, for example. The drink pouch 166 has a spout 168 to which the filtering member and lid as described above are attached so as to provide a portable liquid purifying device.

Even after the liquid is purified by the liquid purifying device as described above, the liquid remains between the activated carbon and the micro-porous membrane filter within the filtering member, and microorganisms that exist in the remaining liquid may propagate and cause an offensive odor or smell. To prevent the propagation of the microorganisms in the liquid, portions of the device which may be affected by the microorganisms are preferably given an antibacterial property. For example, the liquid purifying device may employ antibacterial activated carbon, or a mesh sheet or sheets having an antibacterial property. Also the micro-porous hollow fibers may be coated with a powder or granules of antibacterial material such as antibacterial zeolite, for example, or the hollow fiber module may consist of antibacterial fibers in addition to the ordinary hollow fibers. It is also possible to use micro-porous hollow fibers having an antibacterial property. The mesh sheet(s) may be replaced by a non-woven fabric.

When an antibacterial material in the form of powder, granules or the like is used for giving the above-described liquid purifying device an antibacterial property, in particular, such antibacterial material needs to be positioned upstream of the micro-porous membrane filter disposed in the second section within the filtering member, as viewed in the direction of flow of the liquid. This allows the liquid that exists in the filtering member to inevitably contact the antibacterial material. The antibacterial material (which includes bactericide or disinfectant) may be preferably selected from inorganic bactericides containing silver, such as one (available from Sinagawa Fuel Co., Ltd.) made from zeolite doped with silver ion by ion exchange, one (available from Sangi Co. Ltd.) containing calcium phosphate adsorbing silver, one (available from Toa Gosei Chemical Industry Co., Ltd.) containing zirconium phosphate doped with silver ion, one (available from Ishizuka Glass Co., Ltd.) obtained by dissolving silver oxide in a glass component, one (available from Matsushita Electric Industry Co., Ltd.) containing silicon dioxide (oxide) adsorbing a silvercomplex, and one obtained by adsorbing a titania-type carrier with silver ion (available from Taihei Chemical Industry Co., Ltd.). A granular product of antibacterial polymer adsorbing chlorine may be also effectively used as a bactericide.

The above-indicated antibacterial powder may be used in the second section of the filtering member such that the micro-porous hollow fibers are coated with the powder, or may be mixed with the activated carbon in the first section. It is also possible to mix the antibacterial powder with activated fibrous carbon when the activated carbon is formed into a desired shape. FIG. 6 shows an example in which a granular antibacterial material 170 is mixed with activated fibrous carbon. When the antibacterial material is provided in the first section of the filtering member, a part of the antibacterial material moves from the first section to the second section during use of the liquid purifying device, to thereby advantageously prevent propagation of microorganisms in both the first and second sections. Needless to say, the antibacterial material may be provided in both the first and second sections from the beginning. When the ion exchange resin column 150 is disposed in the bottleneck 44 of the bottle 40, as shown in FIG. 7, the antibacterial material as described above may be mixed with the ion exchange resin 158 in the column 150. In this case, a part of the antibacterial material moves toward the first and second sections of the filtering member during use of the purifying device, so as to effectively prevent occurrence of microorganisms.

What is claimed is:

1. A portable liquid purifying device for dispensing a liquid, comprising:
    a thin-walled squeezable bottle comprising soft material and having an interior space in which a mass of the liquid to be dispensed is stored, said bottle having (i) a bottleneck at one axial end thereof through which the liquid is dispensed, (ii) a substantially cylindrical shape with a bottom at the other axial end thereof, and (iii) a wall thickness small enough to allow said bottle to be folded or rolled when not in use;
    a filtering member removably engaging said bottleneck of said bottle, said filtering member comprising a first section containing activated carbon, and a second section containing a micro-porous membrane filter comprising hollow fibers, the micro-porous membrane filter comprising hydrophilic micro-porous hollow fibers and hydrophobic micro-porous hollow fibers or comprising micro-porous hollow fibers each having a hydrophilic portion and a hydrophobic portion, so that air can be discharged from the interior of the bottle through the hydrophobic hollow fibers or the hydrophobic portion when the bottle is squeezed, said first and second sections being disposed in series so that the liquid dispensed from said bottle passes through said first and second sections in this order, said filtering member further comprising a spout formed adjacent to said second section, said filtering member being fluid-tightly and air-tightly attached to said bottleneck such that said first section is located closer to said bottleneck than said second section and such that said filtering member does not protrude into said interior space past said bottleneck; and
    a cover assembly for covering said spout of said filtering member, said cover assembly comprising a first position for fluid-tightly closing said spout, and a second position for opening said spout so as to permit the liquid to be dispensed from the liquid purifying device.

2. A portable liquid purifying device according to claim 1, wherein said filtering member further comprises a cylindrical housing attached at one axial end thereof to said bottleneck of said bottle and having said spout formed at the other axial end thereof, and a cylindrical member disposed within said cylindrical housing, said cylindrical member having a bottom at one axial end and a cylindrical wall portion having a plurality of through-holes formed therethrough, said spout communicating with the inside of said cylindrical member which forms said second section, said cylindrical member being surrounded by an activated carbon layer which constitutes said first section.

3. A portable liquid purifying device according to claim 1, wherein said filtering member further comprises a cylindrical housing attached at one axial end thereof to said bottleneck of said bottle and having said spout formed at the other axial end thereof, said filtering member further comprising a fluid-permeable partition member disposed at an axially middle portion of said cylindrical housing to divide the inside of said housing into said first section on the side of said bottleneck, and said second section on the side of said spout.

4. A portable liquid purifying device according to claim 3, wherein said cylindrical housing comprises a cylindrical portion formed integrally with an end portion of the cylindrical housing which defines said first section, such that said cylindrical portion is spaced radially outwardly from an outer circumferential surface of said end portion of said cylindrical housing, said cylindrical portion being attached to said bottleneck of said bottle such that at least a part of said first section is located within said bottleneck.

5. A portable liquid purifying device according to claim 1, wherein said filtering member further comprises a generally cylindrical member having a first portion and a second portion, said cylindrical member having a spout formed through a bottom wall of said first portion, said second portion being attached to said bottleneck of said bottle, said second section extending from said first portion into said second portion, said first section being formed radially outwardly of said second section, at least a part of said first and second sections being located within said bottleneck when said cylindrical member is attached to said bottleneck.

6. A portable liquid purifying device according to claim 1, wherein said filtering member further comprises an ion exchange resin disposed upstream of said micro-porous membrane filter in said second section, as viewed in a direction of flow of the liquid, such that the liquid to be dispensed out of said spout through said filtering member contacts said ion exchange resin before contacting said micro-porous membrane filter.

7. A portable liquid purifying device according to claim 6, wherein said ion exchange resin is contained in said bottle, such that the liquid in said bottle contacts said ion exchange resin.

8. A portable liquid purifying device according to claim 6, further comprising a fluid-permeable container disposed upstream of said first section of said filtering member, as viewed in the direction of flow of the liquid, said ion exchange resin being contained in said fluid-permeable container.

9. A portable liquid purifying device according to claim 1, wherein said filtering member further comprises a powder or granular antibacterial material disposed upstream of said micro-porous membrane filter in said second section, as viewed in a direction of flow of the liquid, such that the liquid present in said filtering member contacts said antibacterial material.

10. A portable liquid purifying device according to claim 9, wherein said antibacterial material is disposed in at least one of said first and second sections of said filtering member.

11. A portable liquid purifying device according to claim 1, further comprising a non-woven fabric covering said activated carbon.

12. A portable liquid purifying device according to claim 1, wherein said bottle has a stepped portion formed adjacent to said bottleneck, the liquid purifying device further comprising a cup-shaped cover having an open end portion which is snugly placed on said stepped portion of said bottle, so as to cover a whole assembly of said filtering member and said cover assembly.

13. The portable liquid purifying device of claim 1, wherein the thin-walled squeezable bottle has a low resiliency to prevent restoration of the bottle to its original shape after release of a squeezing force therefrom, due to softness of the soft material of the bottle and small wall thickness of the bottle.

* * * * *